I. McCOON.
TRUCK.
APPLICATION FILED NOV. 21, 1914.

1,146,635.

Patented July 13, 1915.
2 SHEETS—SHEET 1.

Witnesses

Inventor:
Ira McCoon

I. McCOON.
TRUCK.
APPLICATION FILED NOV. 21, 1914.
1,146,635.
Patented July 13, 1915.
2 SHEETS—SHEET 2.
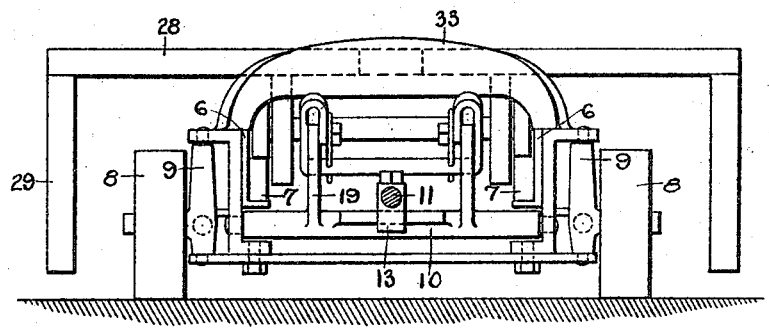
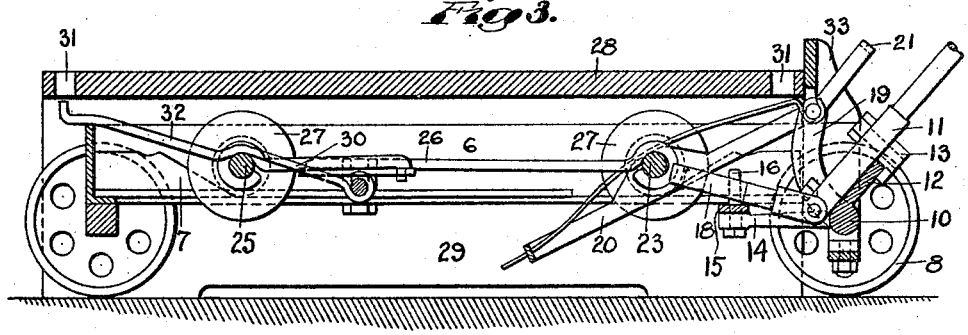
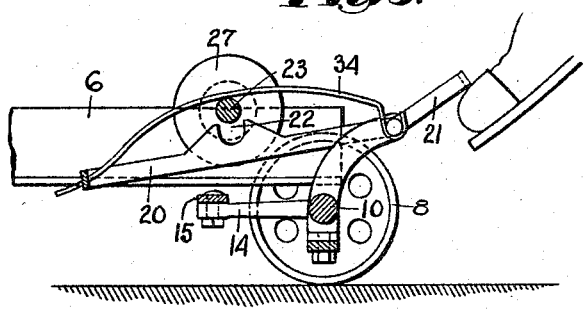
Witnesses
Inventor:
Ira McCoon

UNITED STATES PATENT OFFICE.

IRA McCOON, OF WINDSOR LOCKS, CONNECTICUT.

TRUCK.

1,146,635. Specification of Letters Patent. Patented July 13, 1915.

Application filed November 21, 1914. Serial No. 873,303.

*To all whom it may concern:*

Be it known that I, IRA McCOON, a citizen of the United States, and a resident of Windsor Locks, in the county of Hartford and State of Connecticut, have invented a new and Improved Truck, of which the following is a full, clear, and exact description.

My invention relates to trucks and is an improvement over my Patent No. 1,103,796, issued July 15, 1914. It is characterized from the said patent by the simplified structure of the means for raising and lowering the platform and also by means for locking the platform during the reciprocating movement thereof, so as to prevent the shifting of the platform due to the uneven distribution of load thereon. It is further characterized by the provision of means whereby the tongue for the reciprocating movement of the platform can be actuated without causing a reciprocation of the platform.

An object of the invention is to provide a manually-operated truck, by means of which the time and expense involved to load the truck is reduced to a minimum.

Another object of the invention is to provide a simple, inexpensive, strong and convenient manually-operated truck, in which the platform for loads is made to move bodily and in which the platform can be maintained in its extreme position without any effort.

With the above and other objects in view, the nature of which will more fully appear as the description proceeds, the invention consists in the novel construction, combination and arrangement of parts as herein fully described, illustrated and claimed.

Figure 1:
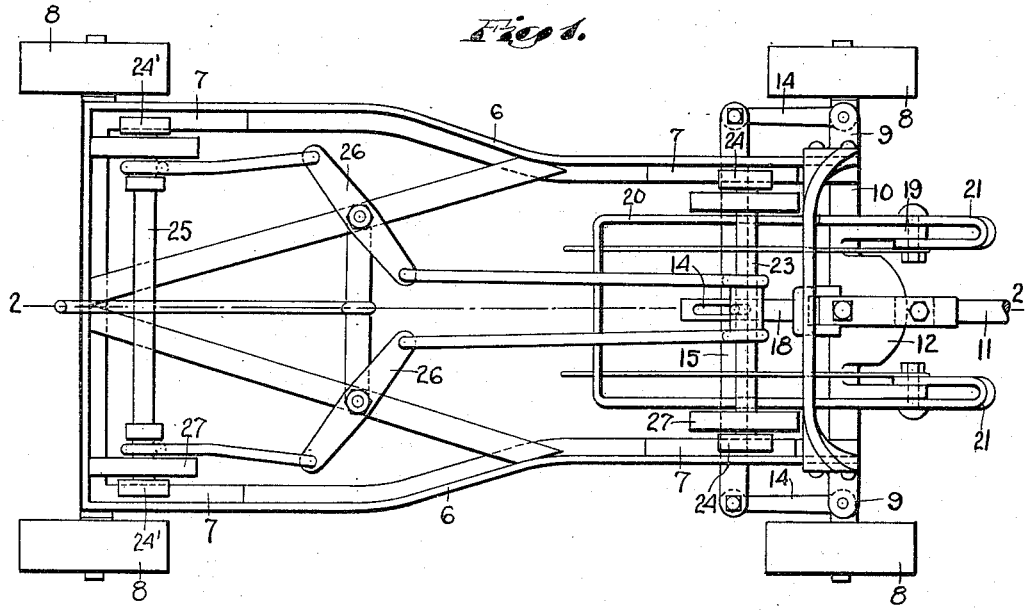
Figure 2:
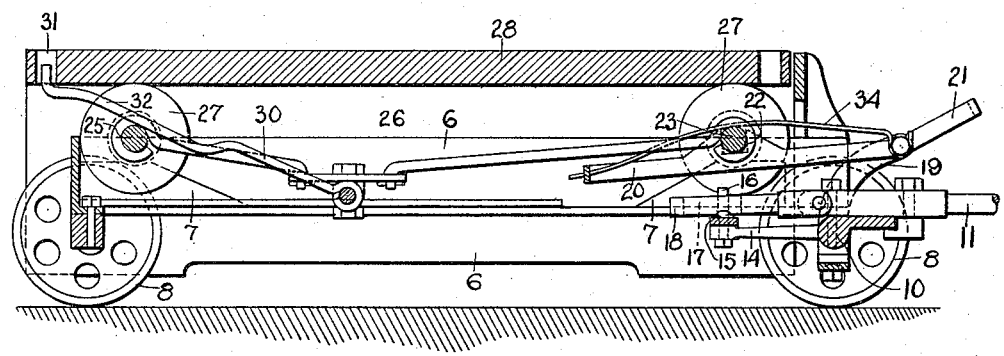

In the accompanying drawings forming part of the application similar characters of reference indicate corresponding parts in all the views and Figure 1 is a plan view of an embodiment of my invention, with the platform for loads removed; Fig. 2 is a longitudinal section on line 2—2 of Fig. 1, showing the platform in its raised position; Fig. 3 is a similar section, showing the platform for loads disengaged from the truck and resting on the floor; Fig. 4 is a front view of the truck; and Fig. 5 is a fragmentary longitudinal section, similar to Fig. 3, showing the tongue disconnected from the means for raising and lowering the platform.

Referring to the drawings, 6 represents the side members of the truck frame, each member being provided adjacent the ends thereof with cams or guide portions 7. The frame of the truck is mounted on wheels 8, each forward wheel being connected by a steering knuckle 9 to the frame.

Pivotally mounted in front of the truck frame between the steering knuckles 9, is a member 10, to which is pivotally attached a tongue 11. The member 10 in the central and front part thereof is provided with an arcuated part 12, which is engaged by a bracket 13 carried by the tongue 11. This bracket engages the arcuated part and prevents any movement of the tongue in the vertical plane relative to said member 10, while it permits side movement of said tongue. Extending from the knuckles 9 are arms 14 which are united by a tie rod 15, from the middle part of which a pin 16 projects. The pin engages an elongated slot 17 provided in a link 18, which link is pivotally connected to the tongue 11, adjacent its pivotal connection with the member 10. It will be noted that this link connection of the tie rod 15 with the tongue will cause a movement of the tie rod when the tongue is moved sidewise, but it will leave the tie rod undisturbed when the tongue is moved in a vertical plane.

The member 10 on each side of the arcuated part 12 is provided with an arm 19, to the end of which arm, a U-shaped member 20 is secured. This U-shaped member has U-ends 21, extending beyond the arms 19 in front of the truck frame and serving the purpose of moving said U-shaped member 20 on the arms 19 when necessary, as will appear hereinafter. The sides of the U-shaped member are provided with alining notches 22 forming bearings for a shaft 23, at the ends of which, rollers 24 are provided. The said rollers 24 are adapted to engage the cams 7 positioned adjacent the front of the truck frame. Positioned adjacent the rear part of the truck frame, is another shaft, 25, provided with rollers 24' adapted to engage the cams 7 provided at the rear end of the truck frame. The two shafts are interconnected by a system of rods 26. so that when the front shaft 23 is moved by the tongue to or away from the front, the rear shaft will move correspondingly to or away from the rear.

By oscillating the tongue 11 in the vertical plane the member 10 will rock, causing the arms 19 to swing, carrying therewith the U-shaped member 20, which will move the shaft 23 and consequently the shaft 25. The said shafts 23 and 25 are provided adjacent their rollers 24 and 24', with larger rollers 27, which rollers engage the platform 28 when the rollers 24 and 24' are caused to rise on the cams 7. The rollers 24 and 24' will roll upon the cams 7 when the arms 19 are moved away from the front of the truck frame. The platform 28 is normally supported by its sides 29 on the floor, in which position the same is loaded and can be easily engaged by the truck when the rollers 24 and 24' are not engaging the cams, as indicated in Fig. 3. After the platform has been engaged by the truck frame, the tongue 11 is moved downwardly causing the arms 19 of the member 10 to move away from the front of the truck frame, consequently causing the rollers 24 and 24' to engage the cams 7, the rollers 27 carried by the shafts 23 and 25 engaging the under side of the platform 28 and raising the same from the floor. To prevent any lateral and particularly any longitudinal displacement of the platform, while it is being raised, I provide a catch 30, one end of which is pivotally secured to the frame and the other end of which is shaped to engage an aperture 31 provided at the ends of the platform. This catch has a cam portion 32 engageable by the shaft 25 when the roller 24' rolls upon the cams 7, whereby the said end of the catch engages the aperture 31, preventing any displacement of the platform relative to the truck under the platform. To bring the end of the catch 30 in register with the aperture 31 without any previous adjustment, the truck frame in the front thereof, is provided with a front brace 33 adapted to engage the end of the platform, thereby automatically bringing the aperture 31 into alinement with the end of the catch 30. It will be noted that this end of catch 30 will engage the aperture 31 as soon as the roller 24' is caused to engage the cams 7 and before the rollers 27 come into engagement with the platform 28.

To permit the movement of the tongue 11 in a vertical plane without moving the platform 28, it is only necessary to move the U-shaped member away from the shaft 23 by simply forcing the ends 21 of the U-shaped member in the direction of the arrow indicated in Fig. 5. This will cause a disengagement between the bearings of the U-shaped member with the shaft 23. To reengage the U-shaped member with the shaft 23, the extensions 21 of said U-shaped member 20 are moved into the opposite direction.

To prevent accidental disengagement of the shaft 23 from the U-shaped member 20, a flat spring 34 is provided which normally maintains the engagement between the U-shaped member 20 and the shaft 23.

From the foregoing description, taken in connection with the accompanying drawings, the advantage of the construction and operation of the truck shown, will be readily understood by those skilled in the art to which the invention pertains and while I have described the principle of operation together with the truck which I now consider to be the best embodiment thereof, I desire to have it understood that the contrivance shown is merely illustrative and that such changes may be made when desired as are within the scope of the appended claims.

Having thus described my invention, I claim as new and desire to secure by Letters Patent:

1. In a truck, in combination, a detachable-load platform, a truck frame having a tongue for manipulating the platform, means for raising and lowering the platform actuated by the movement of the tongue, and locking means, operable by the movement of said means for raising and lowering the platform, adapted to engage the platform and prevent its accidental displacement when the platform is raised, lowered or transported.

2. In a truck, in combination, a load platform having apertures at the ends thereof, a truck frame having a tongue for manipulating the same, a catch on said frame adapted to engage one of the apertures of the platform, whereby the same is prevented from accidental displacement on the truck, and means for raising and lowering the platform operable by the tongue, said means controlling the movement of said catch.

3. In a truck, in combination, a detachable load platform, a truck frame having a tongue adapted to oscillate vertically and transversely, means for locking the platform to the truck, operable by the vertical movement of the tongue, and means for raising and lowering the truck also operable by said tongue, said locking means being operated by the tongue before the platform is raised and after it is lowered.

4. In a truck, in combination, a detachable load platform, a truck frame, a pair of rear wheels, a pair of front wheels pivotally attached to said frame, a tongue support in said frame mounted to swing in a vertical plane, a tongue on said support mounted to swing transversely of the frame, cam surfaces on said frame, rollers thereon for engaging the platform, a system of levers interconnecting said rollers, a U-shaped member detachably connecting said rollers to said tongue support, a tie rod connecting said pair of front wheels, and a link connecting said tongue to said tie rod, whereby the same can be actuated only during the transverse movement of said tongue.

5. In a truck, in combination, a truck frame having cams adjacent the ends at each side thereof, wheels for said truck, the front wheels being pivotally attached to said frame, a tongue support in the front of the frame mounted to swing in a vertical plane, a tongue on said support mounted to swing transversely of the frame, a load platform surrounding said truck frame, a shaft adjacent each end of the frame, rollers at each end of said shaft for engaging the cams and the platform, a system of levers connecting said shaft, said tongue support having a pair of arms, a U-shaped member in pivotal connection with said arms, the sides of the U-shaped member forming bearings for the shaft adjacent the front of the truck, a resilient member tending to maintain the engagement of said shaft with the U-shaped member, said U-shaped member having the ends thereof extending beyond the arms of the tongue support, whereby said U-shaped member can be disengaged from the shaft, a tie rod connecting the pivotally attached wheels, and a link connecting said tie rod to the tongue.

6. In a truck, in combination, a truck frame having cams adjacent the ends at each side thereof, wheels for said truck, the front wheels being pivotally attached to said frame, a tongue support in the front of the frame mounted to swing in a vertical plane, a tongue on said support mounted to swing transversely of the frame, a load platform surrounding said truck frame, a shaft adjacent each end of the frame, rollers at each end of said shaft for engaging the cams and the platform, a system of levers connecting said shaft, said tongue support having a pair of arms, a U-shaped member in pivotal connection with said arms, the sides of the U-shaped member forming bearings for the shaft adjacent the front of the truck, a resilient member tending to maintain the engagement of said shaft with the U-shaped member, said U-shaped member having the ends thereof extending beyond the arms of the tongue support, whereby said U-shaped member can be disengaged from the shaft, a tie rod connecting the pivotally attached wheels, a link connecting said tie rod to the tongue, said platform having apertures at the ends thereof, and a catch pivotally mounted on the frame, said catch having a cam portion adapted to be engaged by the rear shaft, whereby when said platform is raised, said catch is made to engage the platform and thereby prevent its accidental displacement.

7. In a truck, in combination, a detachable load platform, a truck frame having a tongue mounted to oscillate vertically and transversely, means on said truck frame for raising and lowering the platform, including a shaft adjacent each end of the frame and disposed transversely thereof, a pair of arms adapted to participate in the vertical movement of said tongue, a U-shaped member in pivotal connection with said arms, said U-shaped member having notches in the sides thereof adapted to engage the shaft at the front of the frame, and a resilient member tending to maintain the engagement of the shaft with the U-shaped member, said U-shaped member having its ends extending beyond the pivotal connection of said U-shaped member with the arms, whereby said U-shaped member can be engaged or disengaged from said shaft in the front.

8. In a truck, in combination, a load platform having apertures at the ends thereof, a truck frame having a tongue mounted to oscillate vertically and transversely, means on said truck frame for raising and lowering the platform, including a shaft at each end of said frame, a catch on said frame adapted to engage the apertures of the platform, said catch having a cam portion adapted to be engaged by said shaft at the rear of the frame when said means for raising and lowering the platform are actuated, a pair of arms adapted to participate in the vertical movement of said tongue, and a U-shaped member detachably connecting said arms to said shaft whereby the vertical movement of said tongue is transmitted to said means for raising and lowering the platform.

In testimony whereof I have signed my name to this specification in the presence of two subscribing witnesses.

IRA McCOON.

Witnesses:
ARTHUR W. BURT,
L. D. CUTLER.

Copies of this patent may be obtained for five cents each, by addressing the "Commissioner of Patents, Washington, D. C."